(12) United States Patent
Ahn et al.

(10) Patent No.: US 8,270,677 B2
(45) Date of Patent: Sep. 18, 2012

(54) OPTICAL POINTING DEVICE AND METHOD OF DETECTING CLICK EVENT IN OPTICAL POINTING DEVICE

(75) Inventors: Keon Joon Ahn, Seongnam-si (KR); Hwan Soo Bae, Anyang-si (KR)

(73) Assignee: Crucialtec Co., Ltd., Chungcheongnam-Do (KR)

( * ) Notice: Subject to any disclaimer, the term of this patent is extended or adjusted under 35 U.S.C. 154(b) by 753 days.

(21) Appl. No.: 12/403,854

(22) Filed: Mar. 13, 2009

(65) Prior Publication Data
US 2009/0245574 A1    Oct. 1, 2009

(30) Foreign Application Priority Data
Apr. 1, 2008 (KR) .................. 10-2008-0030438

(51) Int. Cl.
*G06K 9/00* (2006.01)
(52) U.S. Cl. .................... 382/107; 382/103; 356/614
(58) Field of Classification Search .............. 382/103, 382/107; 356/614
See application file for complete search history.

(56) References Cited

U.S. PATENT DOCUMENTS

| | | | |
|---|---|---|---|
| 6,037,929 A | 3/2000 | Ogura et al. | |
| 6,166,370 A | 12/2000 | Sayag | |
| 6,501,846 B1 | 12/2002 | Dickinson et al. | |
| 7,313,255 B2 | 12/2007 | Machida et al. | |
| 2004/0234107 A1 | 11/2004 | Machida et al. | |
| 2005/0243053 A1 | 11/2005 | Liess et al. | |
| 2006/0028442 A1* | 2/2006 | Bynum et al. | 345/157 |
| 2006/0038776 A1* | 2/2006 | Ahn et al. | 345/156 |
| 2006/0132435 A1* | 6/2006 | Machida | 345/157 |
| 2007/0018970 A1* | 1/2007 | Tabasso et al. | 345/184 |
| 2007/0063130 A1* | 3/2007 | Ahn et al. | 250/221 |
| 2008/0218474 A1* | 9/2008 | Ahn et al. | 345/158 |
| 2008/0218769 A1* | 9/2008 | Ahn et al. | 356/614 |

OTHER PUBLICATIONS

Korean Office Action issued in Korean Patent Application No. 10-2008-0030438, dated May 25, 2009.
European Search Report issued in European Patent Application No. EP 09 15 5473 dated Jul. 30, 2009.

* cited by examiner

*Primary Examiner* — Jason M Repko
*Assistant Examiner* — Katrina Fujita
(74) *Attorney, Agent, or Firm* — McDermott Will & Emery LLP

(57) ABSTRACT

A method of detecting a click event for sensing a motion of a finger corresponding to a click on a sensing area of an optical pointing device, the method including: obtaining an image of the finger from the sensing area; sensing a change in the image of the finger; analyzing a horizontal movement of the finger based on the change in the image of the finger; and generating a click signal when the horizontal movement of the finger is within a predetermined range is provided.

14 Claims, 8 Drawing Sheets

OPTICAL POINTING DEVICE AND METHOD OF DETECTING CLICK EVENT IN OPTICAL POINTING DEVICE

CROSS-REFERENCE TO RELATED APPLICATION

This application claims the benefit of Korean Patent Application No. 10-2008-0030438, filed on Apr. 1, 2008, in the Korean Intellectual Property Office, the disclosure of which is incorporated herein by reference.

BACKGROUND OF THE INVENTION

1. Field of the Invention

The present invention relates to a terminal including an optical pointing device, and more particularly, to a click recognition method that can detect a click event using an optical pointing device, instead of using a separate button.

2. Description of Related Art

Generally, a portable device such as a cellular phone or a personal digital assistant (PDA) adopts a user interface using a keypad. The keypad included in the portal device consists of a plurality of direction buttons and buttons for inputting numbers and characters.

As a wireless Internet service such as a Wireless Broadband (WiBro) service and the like is currently being commercialized, the personal device also adopts an operating system (OS) that can support a graphical user interface (GUI) such as Window™ of Microsoft.

With the development in technologies, the portable device is using a pointing device such as a computer mouse. The technologies are disclosed in U.S. patent application Ser. Nos. 10/579,702 and 11/189,656.

Generally, a conventional optical pointing device used in the portable device may only move a pointer and a cursor. Therefore, a user may move the pointer or the cursor to a desired location using the optical pointing device and then "click" or "double click" a button that is displayed around or in a lower portion of the optical pointing device. Various types of buttons may be used such as a mechanical button or an electrical button.

However, for example, U.S. Pat. No. 7,313,255, registered on Dec. 25, 2007, discloses technology that can obtain similar results as a click through a vertical movement of a finger, i.e. a Z-axial movement, on an optical pointing device, instead of clicking a separate button.

Also, U.S. Pat. No. 7,313,255 discloses technology regarding "SYSTEM AND METHOD FOR OPTICALLY DETECTING A CLICK EVENT". Here, the optical pointing device may recognize a finger motion from a finger movement on a sensing area The optical pointing device may receive a partial image of the finger in the sensing area, generate a plurality of image signals of the image, and detect a click motion of the finger from the plurality of image signals. In particular, when a tracking quality obtained from the image signals decreases, the finger motion is determined as a finger lift-up motion. Conversely, when the tracking quality increases, the finger motion is determined as a finger put-down motion.

Also, in U.S. Pat. No. 7,313,255, when the put-down motion is detected after the finger lift-up motion is detected, it is determined whether a time interval between the finger lift-up motion and the finger put-down motion is within a predetermined time range, for example, within 0.1 through 0.3 seconds. When the time interval is within the time range, it may be regarded as a click event.

In this instance, the finger may simultaneously perform a vertical movement corresponding to a movement on the Z axis and a horizontal movement corresponding to a movement on the X-Y plane. An intent of the user who performs the above movements may be to relocate the finger on an image window and simultaneously move a cursor by deviating from an image sensing area (image input window of 2.2 mm by 2.2 mm) while moving a cursor, instead of generating a click event. For example, the above movement may frequently occur while scrolling. However, since the above application determines a click event based on only the vertical movement of the finger (the motion on the Z axis), a click event unintended by the user may occur even when the vertical movement and the horizontal movement are simultaneously performed. Specifically, according to a process defined in the above application, the finger motion for scrolling may not be discerned from the finger motion for the click event.

BRIEF SUMMARY

An aspect of the present invention provides a click recognition method that can detect a click event only with a finger motion on an optical pointing device, instead of using a separate button and also can discern a finger motion for a pointer movement and a finger motion for a click event.

Another aspect of the present invention also provides various types of click recognition methods that can discern a finger motion for a pointer movement and a finger motion for a click event.

According to an aspect of the present invention, there is a provided a method of sensing a finger motion on a sensing area to thereby detect a click event, the method including: obtaining an image of the finger from the sensing area; sensing a change in the image of the finger; analyzing a horizontal movement of the finger based on the change in the image of the finger; and generating a click signal when the horizontal movement of the finger is within a predetermined range.

In an aspect of the present invention, the optical pointing device may sense a vertical movement corresponding to a movement on the Z axis, based on change in a light intensity or image quality. In order to determine whether the vertical movement of the finger is for a click event or for relocating the finger on the sensing area while the horizontal movement corresponding to a movement on the X-Y plane for a cursor movement, the optical pointing device may determine whether the horizontal movement of the finger is within a predetermined range. Although the change in the image of the finger corresponding to the vertical movement of the finger is sensed, when the horizontal movement of the finger is outside the predetermined range, it may be determined the finger is moving to left and right sides, or to up and down sides. In this case, the optical pointing device may determine the finger motion is not for the click event.

Accordingly, even when a user horizontally moves the finger in order to move a pointer or a cursor and thereby repeatedly touches the sensing area, the horizontal movement may be discerned from the click event. It is possible to prevent an unintended operation from occurring in an apparatus including the optical pointing device, due to the unintended click or double click.

Also, by defining the click event to an operation of starting with placing of the finger and ending with lifting of the finger, it is possible to match the definition of the click event with a click that occurs by a computer mouse. Therefore, the user may readily use the optical pointing device without confusion.

The placing and lifting of the finger may be recognized based on the light intensity or the image quality. For example, depending on increase or decrease of a shutter value corresponding to the light intensity, the placing of the finger or the lifting of the finger may be sensed. Also, the placing of the finger and the lifting of the finger may be sensed using increase and the decrease of the surface quality that is detected via an image sensor. Also, depending on embodiments, it is possible to compare numerical values such as the shutter value, the surface quality and the like, combine the numerical values, and thereby determine the placing of the finger or the lifting of the finger.

In an aspect of the present invention, the optical pointing device may obtain an image a plurality of times for one second and compare a current finger image with a previous finger image. In this case, it is possible to compare the current finger image with the just previous finger image or a previous-previous finger image. Also, it is possible to calculate movement displacement ($\Delta x$, $\Delta y$) of each image. A movement amount of the finger may be calculated by mathematically adding the movement displacement or processing the movement displacement based on a separate standard.

A temporal standard for calculating the movement amount of the finger may be determined by a period of time from the placing of the finger to the lifting of the finger, or by a portion of the period of time. A method of calculating the movement displacement may use various types of schemes such as mathematical addition, subtraction of an absolute value, and the like.

According to another aspect of the present invention, there is provided an optical pointing device including: a sensor configured to provide a sensing area for sensing a motion of a finger; a light source unit configured to supply light toward the finger on the sensor; an image sensor configured to collect, via the sensor, light that is reflected by the finger to thereby generate an image corresponding to the finger; and a controller configured to discern a horizontal motion of the finger and a click motion based on a change in the image of the finger.

The controller may be configured to sense the change in the image of the finger, analyze the finger motion based on the change in the image of the finger, and generate a click signal when the horizontal motion of the finger is within a predetermined range.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
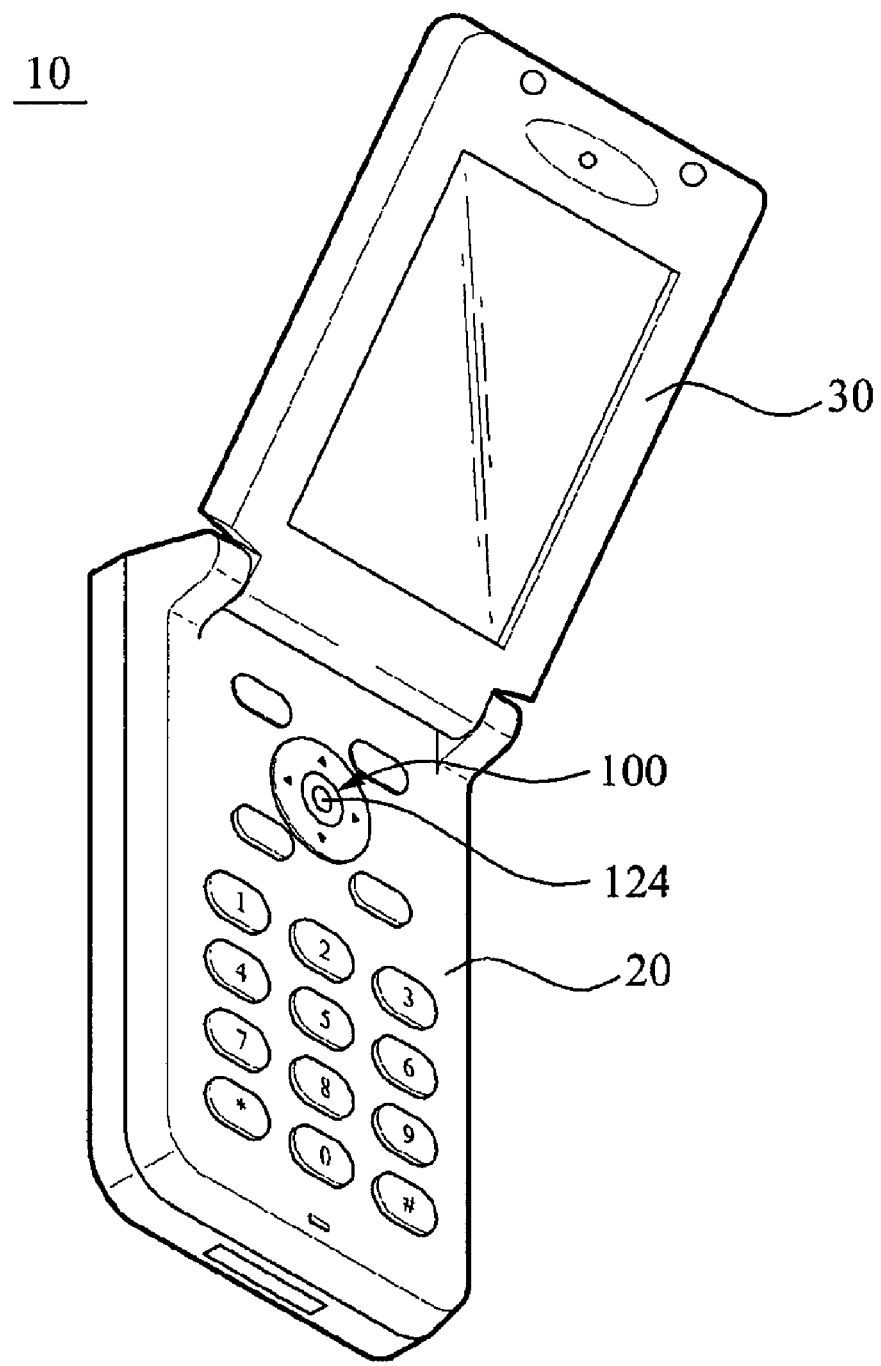
FIG. 1 is a perspective view of a terminal including an optical pointing device according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
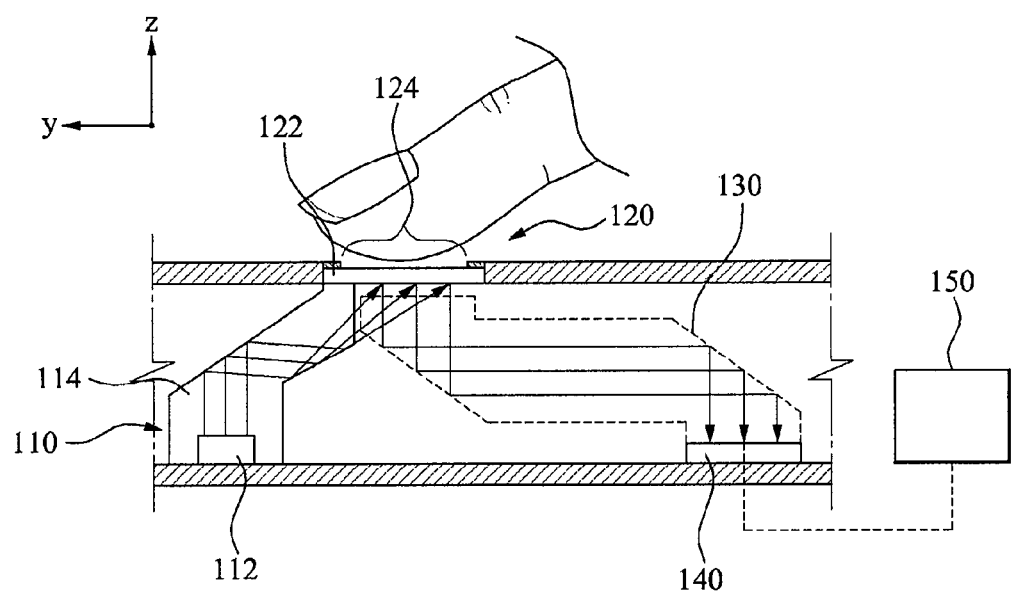
FIG. 2 is a cross-sectional view illustrating an optical pointing device according to an embodiment of the present invention.

FIG. 1 is a perspective view of a terminal 10 including an optical pointing device 100 according to an embodiment of the present invention. FIG. 2 is a cross-sectional view illustrating an optical pointing device 100 according to an embodiment of the present invention.

Referring to FIGS. 1 and 2, the optical pointing device 100 may be provided around a keypad of the terminal 10 and may be used to move a pointer or a cursor displayed on a display, instead of a navigation key.

The terminal 10 includes a body 20 and a folder 30 that is combined with an upper portion of the body 20 via a hinge. A sensing area 124 may be exposed on a cover class of the optical pointing device 100 in the upper portion of the body 20. A user may place a finger on the sensing area 124 to thereby move an end of the finger to left and right sides or up and down sides. Also, the user may change a menu selection by moving the pointer or the cursor through a horizontal movement of the finger, or by moving the pointer or the cursor to a desired direction.

In the present embodiment, the optical pointing device 100 installed in a terminal corresponding to a cellular phone will be described. However, the present invention is not limited thereto. Specifically, the optical pointing device 100 may be widely used for a multimedia player, a navigation device, a notebook computer, a computer peripheral device, and the like.

Referring to FIG. 2, the optical pointing device 100 includes a light source unit 110, a sensor 120, an image sensor 140, and a controller 150. The sensor 120 may provide a sensing area 124. A user may place a finger on a cover glass 122, i.e. the sensing area 124 to thereby move the finger or a body portion to a desired direction. In the present specification, the term "finger" may be interpreted as other body portions in addition to a general finger. Also, the term "finger" may be a replaceable object that can be sensed on the sensing area 124, although it is not a human body portion.

The light source unit 110 may include a light source 112 such as a light emitting diode (LED), and a light source guide 114. The light source guide 114 may be a waveguide to transfer light emitted from the light source 112 to the cover glass 122. The light source guide 114 may be formed of a transmitting material to thereby use a total reflection. Depending on embodiments, the light source guide 114 may use a general mirror or a reflector. The light source unit 110 may not include the light source guide 114 and may also direct the light directly to the cover glass 122 without refraction.

The sensor 120 may include the cover glass 122 and provide the sensing area 124 for sensing a finger motion. The sensing area 124 may be provided on the planar cover glass 122 in a planar type. Depending on embodiments, the sensing area 124 may be provided on the cover glass 122 in a lens type. Although the cover glass 122 is not provided, the sensor 120 may directly expose a portion of a waveguide unit 130 to thereby provide the sensing area 124.

In the present embodiment, when the light source unit 110 supplies light to the cover glass 122, the light may be reflected by the finger and the reflected light may be transferred to the imager sensor 140 via the waveguide unit 130. The waveguide unit 130 may function to transfer the reflected light from the finger to the image sensor 140. Also, the waveguide unit 130 may function to collect the light to thereby support image photographing and may function to eliminate intermediate noise light to thereby increase image clearness on the image sensor 140.

The image sensor 140 may provide various types of reference values in addition to image information according to a design of a manufacturer. For example, the various types of reference values may include a shutter value, a shutter speed, a surface quality, an undirectionality, and the like.

In the case of an image sensor with model name ADNS-3040 provided by Avago Technologies, the shutter value may be adjusted according to a light intensity transferred to the image sensor. Therefore, when the light intensity increases, the shutter value may decrease to thereby correct that a too bright image is output. Conversely, when the light intensity decreases, the shutter value may increase to thereby correct that a too dark image is output. The shutter value may be provided from a chip of the image sensor. In a generally indoor environment, the controller 150 may project lifting of the finger corresponding to increase of the shutter value and may project placing of the finger corresponding to decrease of the shutter value.

However, the tendency of the shutter value may be opposite in an outdoor environment under the sunlight. For example, the light intensity transferred to the image sensor may be more greatly affected by the sunlight than light source of the optical point device. Therefore, when the finger directs an image window, the shutter value may greatly increase. Conversely, when the finger is removed from the image window, the shutter value may greatly decrease. Therefore, in this case, it is possible to project the placing of the finger corresponding to the significant increase of the shutter value and to project the lifting of the finger corresponding to the significant decrease of the shutter value.

The surface quality may be a value associated with a clearness of the image sensed by the image sensor. The surface quality may be determined based on a contrast comparison of the image and the like. When clear finger ridges are obtained with respect to placing of the finger, the surface quality may increase. Conversely, when unclear finger ridges are obtained due to out-focusing corresponding to lifting motion of the finger, the surface quality may decrease. Therefore, the surface quality may be output as a numerical value from the image sensor. It is possible to indirectly project the placing of the finger or the lifting of the finger based on the numerical value. Also, in comparison to the shutter value, the surface quality may be relatively less affected by the surrounding light intensity. Same as in the general indoor environment, even under the sunlight, the surface quality when the finger contacts with the image sensing area may be greater than the surface quality when the finger does not contact with the sensing area. Under the sunlight, the difference between a case where the finger is placed on the image window and a case where the finger is removed from the image window may be decreased in comparison to the general indoor environment. For reference, in the case of the ADNS-3040 image sensor provided by Avago Technologies, the surface quality SQUA may have a value from minimum value zero to maximum value 167. Generally, in the general indoor environment, when the finger is placed on the image sensing area, the surface quality may be output as a value greater than 30. Conversely, when the finger is removed from the image sensing area, the surface quality may be output as a value less than 15.

The undirectionality may denote a direction recognition probability according to a movement of finger ridges. Therefore, it is possible to indirectly project placing of the finger or lifting of the finger depending on increase or decrease of the undirectionality.

The increase or decrease of the shutter value, the surface quality, or the undirectinoality may be measured using various types of schemes. For example, the increase of the shutter value may be absolutely or relatively compared. Generally, in the general indoor environment, it is possible to compare a current shutter value $SV_{crr}$ with a previous shutter value $SV_{pst}$ and sense the finger motion as the lifting of the finger when a ratio $SV_r$ of the current shutter value $SV_{crr}$ to the previous shutter value $SV_{pst}$ is greater than a first upper limit reference, for example, about twice. Conversely, when the ratio $SV_r$ of the current shutter value $SV_{crr}$ to the previous shutter value $SV_{pst}$ is less than a first lower limit reference, for example, about 0.5 folds, it is possible to sense the finger motion as the placing of the finger. The relative comparison may be applicable to the surface quality and the undirectionality.

As described above, in the case of the outdoor environment, the shutter value may significantly increase. In preparation for the significant increase of the shutter value, it is possible to make a decision for lifting of the finger and placing of the finger in a different way under the assumption that the sunlight exists outdoors. For example, under the outdoor sunlight, it may be assumed that the shutter value decreases at least one and a half folds with respect to the lifting of the finger and increases five folds with respect to the placing of the finger. A shutter value ratio standard for discerning the indoor environment and the outdoor environment may be variously selected by a designer. For example, according to the shutter value ratio standard, when the ratio $SV_r$ of the current shutter value $SV_{crr}$ to the previous shutter value $SV_{pst}$ is greater than a second upper limit reference as a result of the comparison between the current shutter value $SV_{crr}$ and the previous shutter value $SV_{pst}$, for example, when $SV_r>5$, although the value is greater than 2 corresponding to the first upper limit reference, the finger motion may be determined as placing of the finger. When the ratio $SV_r$ is less than a second lower limit reference, for example, when $SV_r<1/5$, although the value is less than 1/2 corresponding to the first lower limit reference, the finger motion may be determined as lifting of the finger.

Although the present invention is described herein based on the shutter value, the present invention is not limited thereto. Specifically, it is possible to sense the placing and lifting of the finger using various types of values in addition to the shutter value, the surface quality, and the undirectionality.

Figure 3:
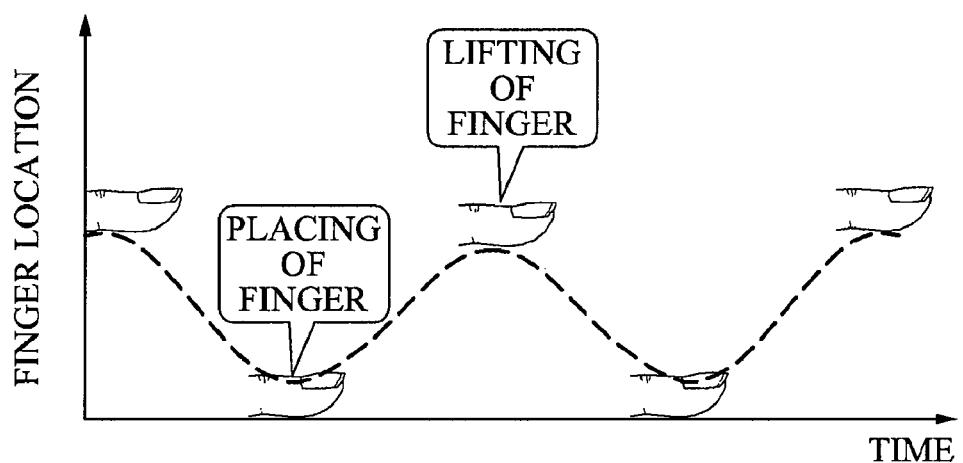
FIG. 3 is a graph for describing change in a shutter value corresponding to placing of a finger and lifting of the finger according to an embodiment of the present invention.
Figure 3:
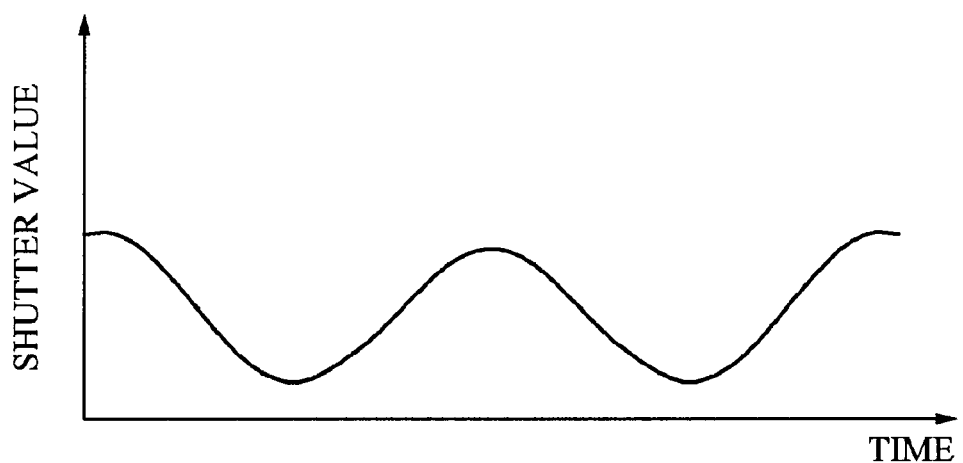
Figure 4:
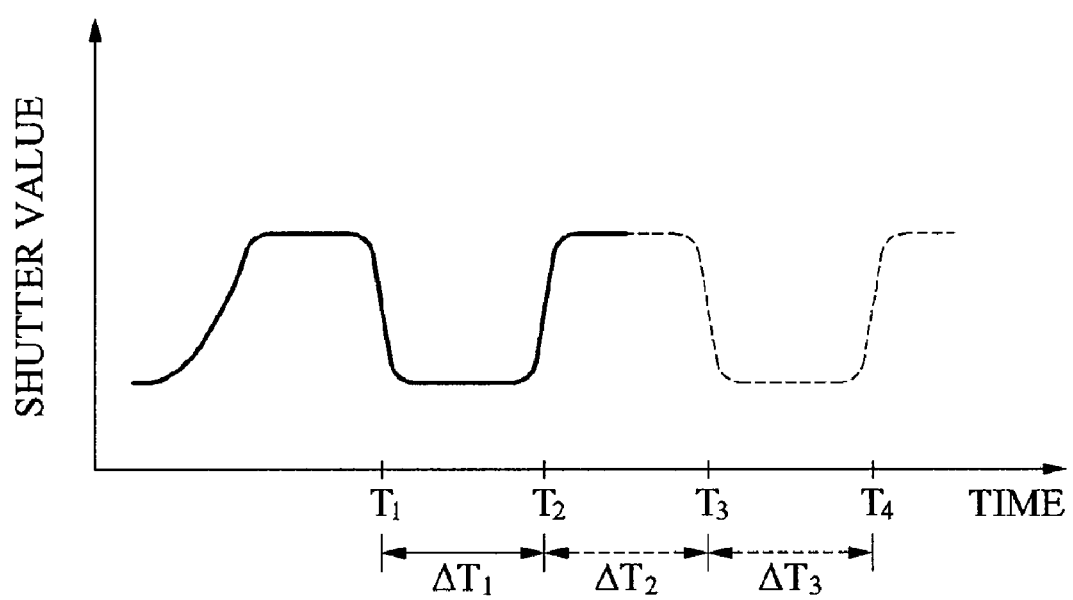
FIG. 4 is a graph for describing a change of a shutter value that may occur corresponding to a click on an optical pointing device according to an embodiment of the present invention.

FIG. 3 is a graph for describing change in a shutter value corresponding to placing of a finger and lifting of the finger in a general indoor environment according to an embodiment of the present invention. FIG. 4 is a graph for describing a change of a shutter value that may occur corresponding to a click event on an optical pointing device in the general indoor environment according to an embodiment of the present invention.

Referring to FIG. 3, under the assumption of the indoor environment, when the finger periodically moves on the sensing area 124 in a vertical direction, that is, performs a movement on the Z axis, the optical pointing device may sense change in the shutter value to thereby sense placing of the finger or lifting of the finger. For example, when the finger moves from a lift location to a place location, the shutter value may decrease. When the finger closely contacts with a cover glass, the shutter value may have an approximate minimum value. Conversely, when the finger moves from the place location to the lift location, the shutter value may increase. When the finger is separated from the cover glass by a predetermined interval, the shutter value may have an approximate maximum value.

As described above, in the outdoor environment under the sunlight, in the case of the placing of the finger, the shutter value may increase. Conversely, in the case of the lifting of the finger, the shutter value may decrease. Therefore, when determining the lifting of the finger or the placing of the finger based on the shutter value, the determination should not be made based on only the increase or decrease of the shutter value. Descriptions related thereto will be made later.

Referring to FIG. 4, based on significant decrease of the shutter value ratio $SV_{crr}/SV_{pst}$, for example, $SV_r<1/2$, it is possible to sense the placing of the finger and to verify time $T_1$ corresponding to the placing of the finger. Also, when the significant increase of the shutter value ratio $SV_{crr}/SV_{pst}$, for example, $SV_r>2$, is sensed immediately after the placing of the finger, it is possible to sense the lifting of the finger and verify time $T_2$ corresponding to the lifting of the finger.

In this instance, it is possible to calculate time difference $\Delta T_1$ between the finger place time $T_1$ and the finger lift time $T_2$ and also to verify whether the time difference $\Delta T_1$ is within a predetermined time range. For example, when the time difference $\Delta T_1$ is within about 0.1 second through 0.3 seconds, it is possible to firstly sense the finger motion as a normal click event. When the time difference $\Delta T_1$ is outside the time range, for example, greater than 0.3 seconds, it is possible to sense the finger motion as a stop motion instead of the click event.

As indicated by dotted line in FIG. 4, it is possible to detect double clicks. For example, it is possible to additionally sense a subsequent finger place time $T_3$ and a finger lift time $T_4$. In this instance, it is possible to calculate time difference $\Delta T_2$ between clicks at $T_2$ and $T_3$ and click continuing time $\Delta T_3$ between $T_3$ and $T_4$.

It is possible to calculate a time interval between clicks based on the time difference $\Delta T_2$ between clicks. Also, it is possible to verify whether it is a normal click event based on the click continuing time $\Delta T_3$.

Figure 5:
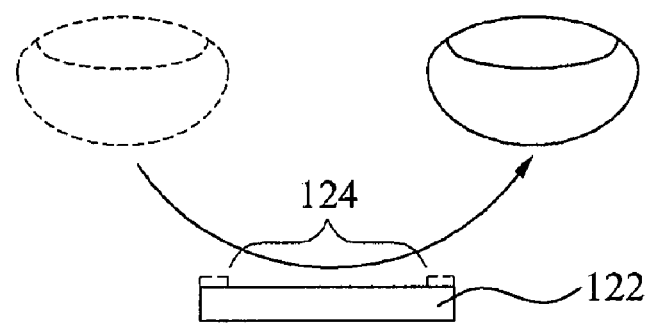
FIG. 5 illustrates a finger motion for a pointer movement according to an embodiment of the present invention.
Figure 6:
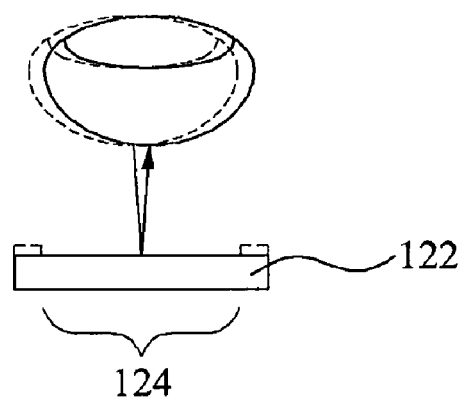
FIG. 6 illustrates a finger motion for a click event according to an embodiment of the present invention.

FIG. 5 illustrates a finger motion for a pointer movement according to an embodiment of the present invention. FIG. 6 illustrates a finger motion for a click event according to an embodiment of the present invention.

Referring to FIGS. 5 and 6, it can be known that the shutter value change like the graph of FIG. 4 occurred with respect to the pointer movement and the click event. Specifically, as shown in FIG. 5, when a finger passes through a sensing area 124 of the cover glass 122 for the pointer movement, the shutter value may significantly increase or decrease. As shown in FIG. 6, when the finger moves on the sensing area 124 of the cover glass 122 for the click event, the shutter value may significantly increase or decrease. Specifically, it may not be possible to determine whether the finger motion is for the pointer movement or the click event based on only the change in the shutter value.

In order to solve the above problem, the following scheme may be used.

Figure 7:
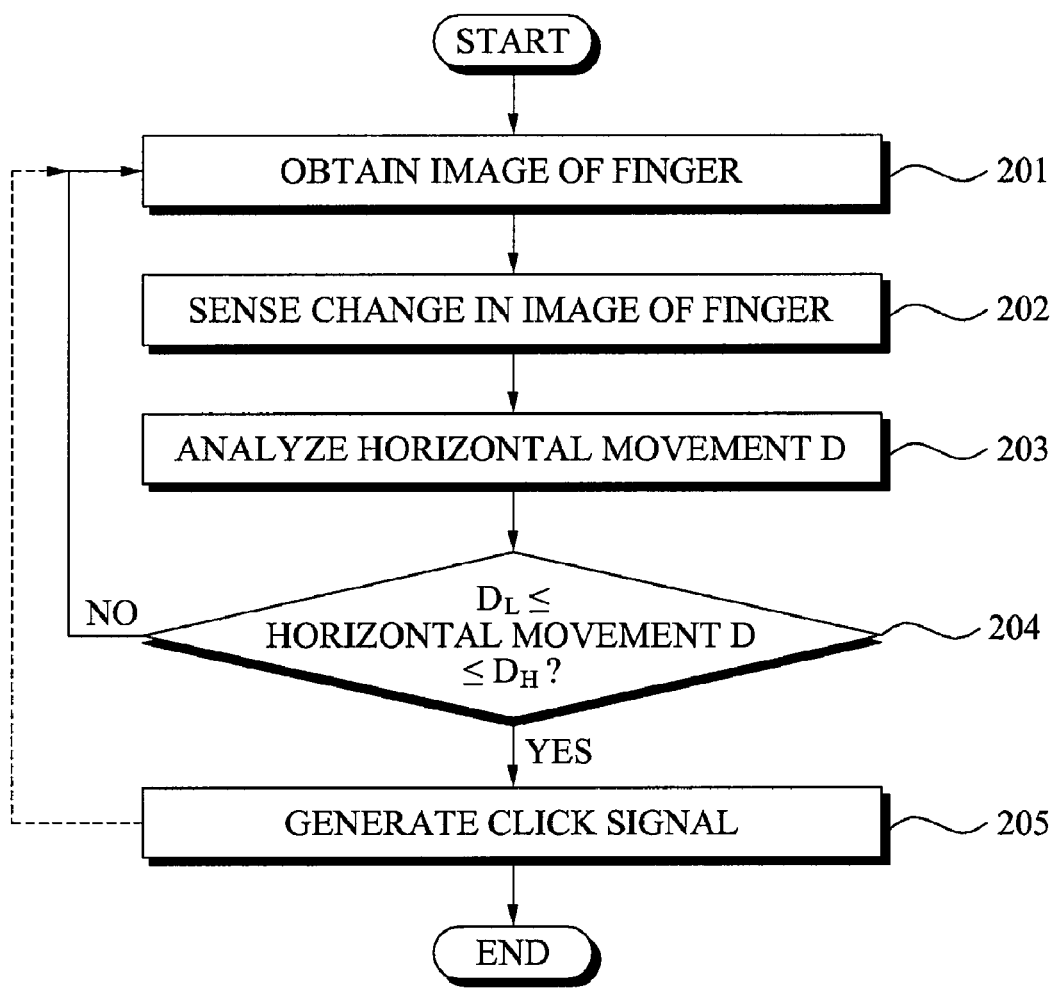
FIG. 7 is a flowchart illustrating a click recognition method according to an embodiment of the present invention.
Figure 8:
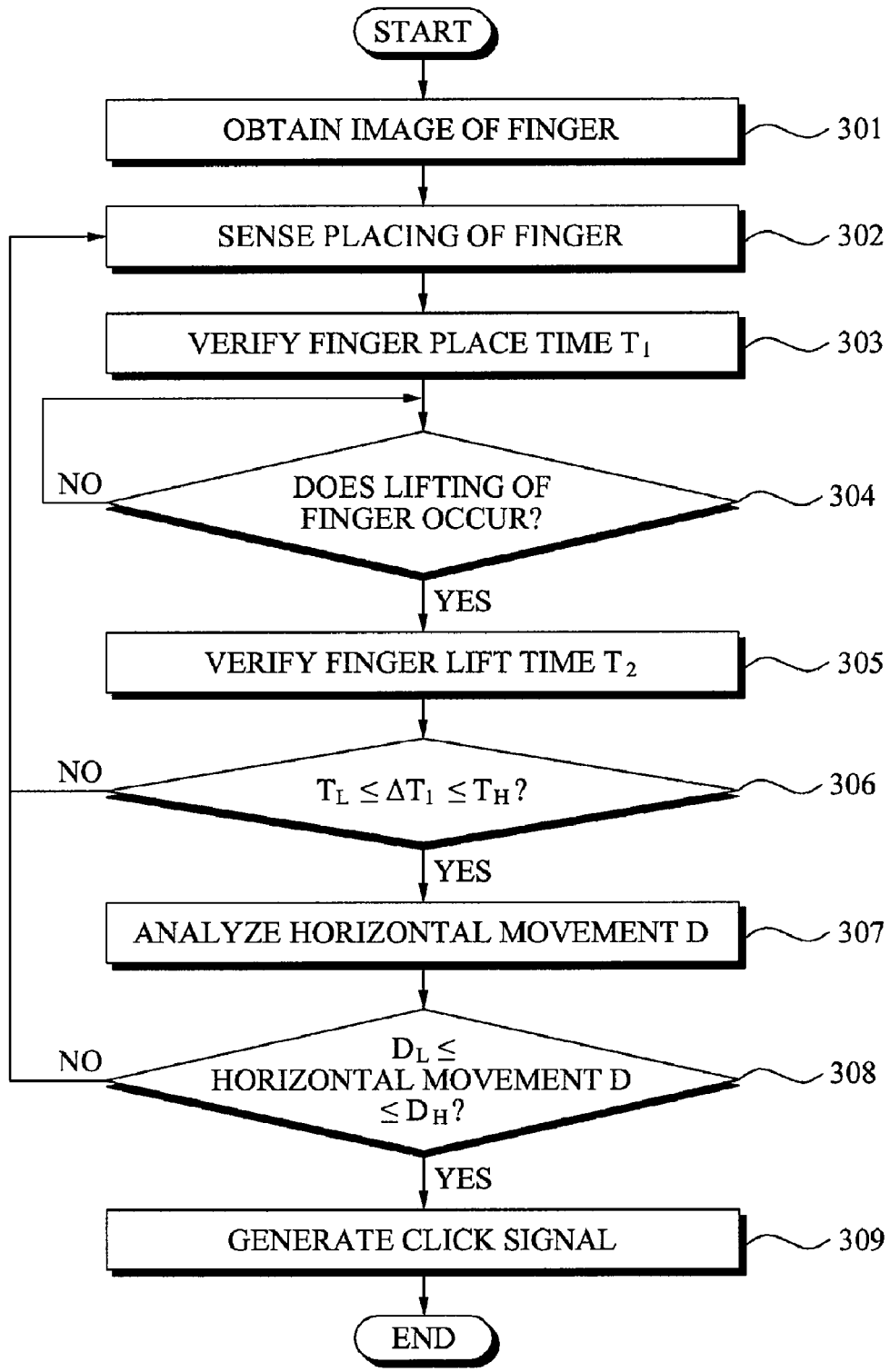
FIG. 8 is a flowchart illustrating a click recognition method according to another embodiment of the present invention.

FIG. 7 is a flowchart illustrating a click recognition method according to an embodiment of the present invention. FIG. 8 is a flowchart illustrating a click recognition method according to another embodiment of the present invention.

Referring to FIG. 7, the click recognition method may include operation 201 of obtaining an image of a finger from a sensing area, operation 202 of sensing a change in the image of the finger, operation 203 of analyzing a horizontal movement of the finger based on the change in the image of the finger, operation 204 of determining whether the horizontal movement of the finger is within a predetermined range, and operation 205 of generating a click signal when the horizontal movement of the finer is within the range.

Operation 201 has been described above with respect to FIG. 2 and related mechanism Operation 202 may be understood from descriptions made with reference to FIG. 4.

Specifically, although placing of the finger and lifting of the finger is sensed based on significant increase and decrease in the shutter value, it is possible to measure the horizontal movement through a motion amount of the finger and compare the measured horizontal movement with a predetermined comparison value.

Figure 9:
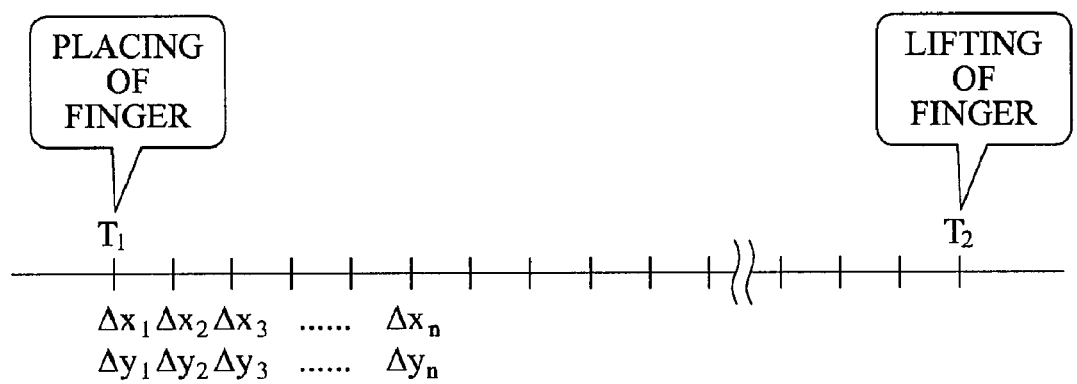
FIG. 9 illustrates a process of calculating finger recognition according to an embodiment of the present invention.

Specifically, as shown in FIG. 9, a period of time between a finger place time $T_1$ and a finger lift time $T_2$ may be divided into a large number of time interval units. An image sensor and a controller may compare a current image with a previous image at each time interval unit to thereby calculate the image change value. For example, a movement displacement of ridges of the finger may be calculated based on each time unit interval by comparing the ridges. It may be represented as the displacement amount of the finger $(\Delta x_n, \Delta y_n)$.

$$\text{Horizontal movement } D = \Sigma |\Delta x_n| + \Sigma |\Delta y_n|. \qquad \text{[Equation 1]}$$

$$\text{Horizontal movement } D = \Sigma (|\Delta x_n|^2 + |\Delta y_n|^2)^{1/2}. \qquad \text{[Equation 2]}$$

$$\text{Horizontal movement } D = \Sigma (\Delta x_n) + \Sigma (\Delta y_n). \qquad \text{[Equation 3]}$$

The above Equations 1 through 3 offer some examples among a plurality of schemes to calculate the movement amount of the finger for a click continuing time $\Delta T_1$ between the finger place time $T_1$ and the finger lift time $T_2$, based on the displacement amount $(\Delta x_n, \Delta y_n)$. The movement amount of the finger may be calculated according to the above-described scheme, or may be calculated according to various types of logics.

In operation 204, it is possible to verify whether the calculated horizontal movement D of the finger is within the range, for example, $D_L \leq D \leq D_H$. When the calculated horizontal D is within the range, it is possible to determine the finger motion as the click event instead of the pointer movement and thereby generate the click signal in operation 205. Generally, lower limit $D_L$ in the boundary of the horizontal movement may be zero.

Also, as indicated by dotted line, after generating the click signal, a process of detecting a subsequent click event may be repeated. Also, it is possible to detect double clicks or multiple clicks.

Referring to FIG. 8, the click recognition method in the optical pointing device may include operation 301 of obtaining an image of a finger from a sensing area, operation 302 of sensing placing of a finger, operation 303 of verifying a finger place time $T_1$, operation 304 of determining whether lifting of the finger occurs, and operation 305 of verifying a finger lift time $T_2$ when lifting of the finger is sensed after operation 304.

As described above, it is possible to sense lifting of the finger and placing of the finger based on comparison of a shutter value, and the like. It is possible to change a condition associated with placing and lifting of the finger according to the shutter value, depending on an indoor environment or an outdoor environment.

When it is determined whether a click continuing time $\Delta T_1$ is within a predetermined time range, for example, $T_L \leq T_1 \leq T_H$, in operation 306 and then the click continuing time $\Delta T_1$ is within the time range, the horizontal movement D may be analyzed in operation 307. Conversely, when the click continuing time $\Delta T_1$ is outside the time range, it is possible to wait for a subsequent click event without analyzing the horizontal movement D.

When the click continuing time is within the predetermined time range, the horizontal movement D may be analyzed. In operation 308, it is possible to verify whether the calculated horizontal movement D is within a predetermined range, for example, $D_L \leq D \leq D_H$. When the horizontal movement D is within the range, it is possible to determine the movement amount as small and determine the finger motion as the click event instead of the pointer movement and thereby generate the click signal in operation 309. Conversely, when the calculated horizontal movement D is outside the range $D_L \leq D \leq D_H$, it is possible to determine the movement amount as large and determine the finger motion as the pointer movement instead of the click event, and thereby not generate the click signal (see FIG. 5).

An optical pointing device according to the present invention may detect a click event without pressing a button. Also, the optical pointing device may more effectively discern iterative touching of a sensing area of the optical pointing device for movement of a pointer or a cursor, and a vertical movement of the finger for a click event.

Also, an optical pointing device according to the present invention may be applicable to double clicks in addition to a single click. In the case of multiple clicks, the optical pointing device may readily discern a click event and a horizontal movement.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of detecting a click event for sensing a motion of a finger corresponding to a click on a sensing area of an optical pointing device, the method comprising:
   obtaining an image of the finger from the sensing area;
   sensing a change in the image of the finger;
   analyzing a horizontal movement of the finger based on the change in the image of the finger; and
   generating a click signal when the analyzed horizontal movement of the finger is within a predetermined range,
   wherein the sensing comprises comparing a current shutter value $SV_{crr}$ with a previous shutter value $SV_{pst}$ at a predetermined time interval to thereby determine the finger motion as placing of the finger when a ratio $SV_r$ of the current shutter value $SV_{crr}$ to the previous shutter value $SV_{pst}$, $SV_r = SV_{crr}/SV_{pst}$, is less than a first lower limit reference and determine the finger motion as lifting of the finger when the ratio $SV_r$ of the current shutter value $SV_{crr}$ to the previous value $SV_{pst}$ is greater than a first upper limit reference, the first lower limit reference being less than 1 and the first upper limit reference being greater than 1.

2. The method of claim 1, wherein the sensing comprises determining a vertical movement corresponding to placing and lifting of the finger.

3. The method of claim 2, wherein the click signal is generated only when the placing of the finger is sensed before the lifting of the finger is sensed based on the change in the image of the finger.

4. The method of claim 2, further comprising:
   calculating a time interval between the placing of the finger and the lifting of the finger; and
   determining whether the calculated time interval is within a predetermined time range,
   wherein, when the calculated time interval is within the time range, the click signal is generated.

5. The method of claim 2, further comprising:
   calculating a time interval between the placing of the finger and the lifting of the finger,
   wherein the horizontal movement of the finger is analyzed with respect to a portion of the calculated time interval or the complete calculated time interval.

6. The method of claim 1, wherein the sensing defines a second lower limit reference less than the first lower limit reference and a second upper limit reference greater than the first upper limit reference, and comprises:
   determining the finger motion as the lifting of the finger when the ratio $SV_r$ of the current shutter value $SV_{crr}$ to the previous value $SV_{pst}$ is less than the second lower limit reference and determining the finger motion as the placing of the finger when the ratio $SV_r$ of the current shutter value $SV_{crr}$ to the previous value $SV_{pst}$ is greater than the second upper limit reference.

7. The method of claim 1, wherein:
   the sensing comprises comparing a current finger image with a previous finger image at a predetermined time interval to calculate a horizontal movement displacement of the finger based on the comparison, and
   the analyzing comprises analyzing the horizontal movement of the finger based on an absolute value of the horizontal movement displacement.

8. The method of claim 7, wherein the generating a click signal includes generating the click signal when the absolute value of the calculated horizontal movement displacement is within the predetermined range.

9. The method of claim 1, wherein the sensing comprises comparing a current finger image with a previous finger image at a predetermined time interval to determine the change in the image of the finger based on at least one of a shutter value that is determined based on a light intensity and an image quality, a shutter speed, a surface quality, and an undirectionality.

10. An optical pointing device, comprising:
   a sensor configured to provide a sensing area for sensing a motion of a finger;
   a light source unit configured to supply light toward the finger on the sensor;
   an image sensor configured to collect, via the sensor, light that is reflected by the finger to thereby generate an image corresponding to the finger; and
   a controller having a processor and configured to discern a horizontal motion of the finger and a click motion based on a change in the image of the finger, wherein the controller is configured to sense the change in the image of the finger, analyze the horizontal motion of the finger based on the change in the image of the finger, and generate a click signal when the analyzed horizontal motion of the finger is within a predetermined range, wherein the sensing comprises comparing a current shutter value $SV_{crr}$ with a previous shutter value $SV_{pst}$ at a predetermined time interval to thereby determine the finger motion as placing of the finger when a ratio $SV_r$ of the current shutter value $SV_{crr}$ to the previous shutter value $SV_{pst}$, $SV_r = SV_{crr}/SV_{pst}$, is less than a first lower limit reference and determine the finger motion as lifting of the finger when the ratio $SV_r$ of the current shutter value $SV_{crr}$ to the previous value $SV_{pst}$ is greater than a first upper limit reference, the first lower limit reference being less than 1 and the first upper limit reference being greater than 1.

11. The optical pointing device of claim 10, wherein the controller is configured to generate the click signal only when placing of the finger is sensed before lifting of the finger is sensed based on the change in the image of the finger.

12. The optical pointing device of claim 10, wherein the controller is configured to compare a current finger image with a previous finger image, calculate a horizontal movement displacement of the finger based on the comparison, and analyze the horizontal movement of the finger based on an absolute value of the horizontal movement displacement, the current finger image and the previous finger image being obtained at a predetermined time interval.

13. The optical pointing device of claim 12, wherein the controller is configured to generate the click signal when the absolute value of the calculated horizontal movement displacement is within the predetermined range.

14. The optical pointing device of claim 10, wherein the controller is configured to compare a current finger image with a previous finger image and determine the change in the image of the finger based on at least one of a shutter value that is determined based on a light intensity and an image quality, a shutter speed, a surface quality, and an undirectionality, the current finger image and the previous finger image being obtained at a predetermined time interval.

* * * * *